United States Patent [19]
Oh

[11] Patent Number: 5,216,719
[45] Date of Patent: Jun. 1, 1993

[54] SUBBAND CODING METHOD AND ENCODING/DECODING SYSTEM

[75] Inventor: Sang H. Oh, Seoul, Rep. of Korea

[73] Assignee: Goldstar Co., Ltd., Rep. of Korea

[21] Appl. No.: 751,746

[22] Filed: Aug. 29, 1991

[30] Foreign Application Priority Data

Aug. 30, 1990 [KR] Rep. of Korea ............... 13542/1990

[51] Int. Cl.[5] ................................................ G10L 5/00
[52] U.S. Cl. ......................................... 381/36; 382/56
[58] Field of Search ............................. 381/36; 382/56

[56] References Cited

U.S. PATENT DOCUMENTS

4,559,602 12/1985 Bates ..................................... 381/36
4,817,182 3/1989 Couso ................................... 382/56

*Primary Examiner*—Emanuel S. Kemeny
*Attorney, Agent, or Firm*—Blakely, Sokoloff, Taylor & Zafman

[57] ABSTRACT

A subband coding method and encoding/decoding system suitable for a high definition television which is possible to compress data more effectively. Frequency band of input data is analyzed into a high-band component and a low-band component in the two-dimensional diagonal direction, the diagonal low-band component is analyzed again into orthogonal high-band component and low-band component and the diagonal high-band component and the orthogonal high-band component are coded, and then the orthogonal low-band component is continuously analyzed until it has a desired size by repeating the previous analysis procedures.

5 Claims, 8 Drawing Sheets

SUBBAND CODING METHOD AND ENCODING/DECODING SYSTEM

BACKGROUND OF THE INVENTION

The present invention relates to a subband coding system for image data, and more particularly to a subband coding method and encoding/decoding system which are suitable for the band compression of luminance signal in a high definition television set (HDTV).

Figure 1:
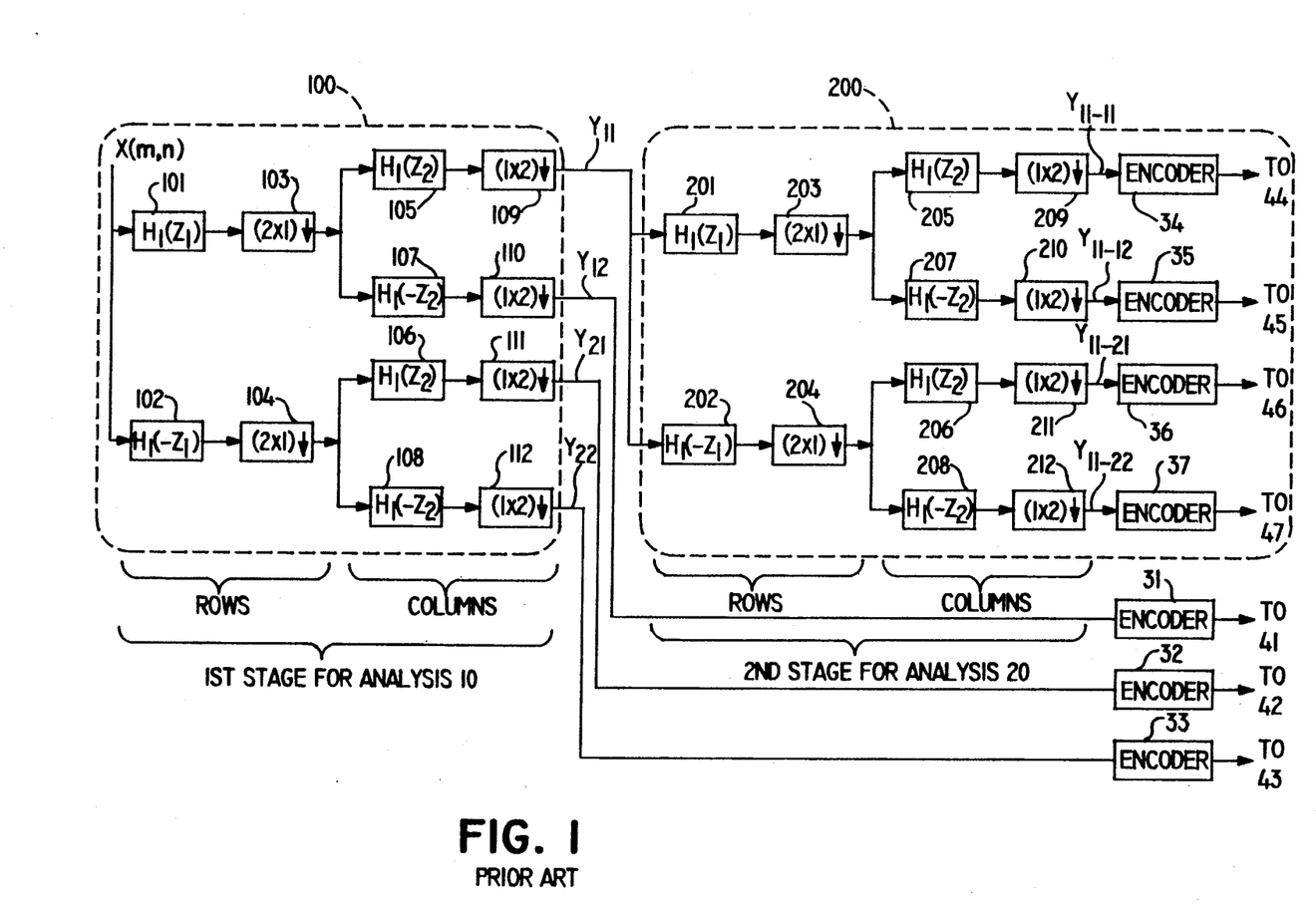
FIG. 1 is a diagram showing a conventional subband encoding system.

A known subband coding system of images is disclosed in U.S. Pat. No. 4,817,182. With reference to FIG. 1, which is a diagram of a conventional subband encoding system of image data, the system is constituted such that digitized image signals [X(m,n)] are analyzed into low-band and high-band signals in the row through filters 101 and 102 of a primary analyzing circuit 100, thereafter sampled by down-samplers 103 and 104. The sampled signals are analyzed into low-band and high-band signals in the column through filters 105, 107 and 106, 108, respectively, and thereafter sampled by samplers 109, 110 and 111, 112, thereby obtaining primary analysis signals Y11, Y12 and Y21, Y22. The primary analysis signals Y11, Y12 and Y21, Y22 are coded by encoders 31, 32 and 33. The primary analysis signal Y11 of low-band is analyzed into low-band and high-band signals and sampled in the row at the secondary analyzing circuit 200 through the same procedures as those in the primary analyzing circuit 100, and then analyzed again into low-band and high-band signals in the column and thereafter sampled in order to obtain secondary analysis signals Y11-11, Y11-12, Y11-21, and Y11-22. The secondary analysis signals Y11-11, Y11-12, Y11-21 and Y11-22 are then coded by the encoders 34, 35, 36 and 37 respectively.

Thus, since three component signals of high-band are coded among the primary analysis signals of four components which have been analyzed at the primary analyzing circuit 100 in the horizontal and vertical directions and one component signal of low-band is coded after obtaining a second analysis signal of four components which have been analyzed at the second analyzing circuit 200 into horizontal and vertical directions, seven component signals are coded in total.

Figure 2:
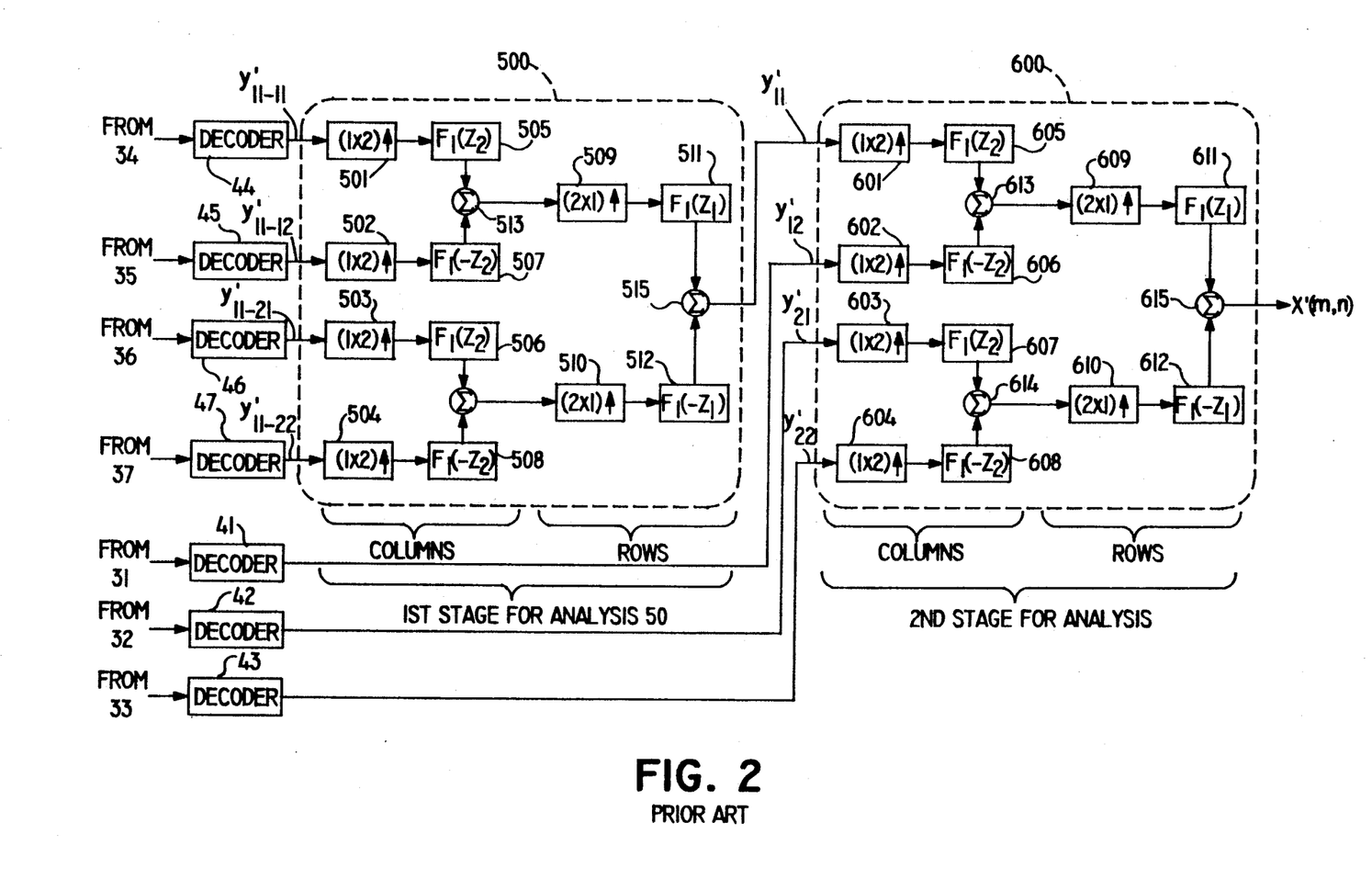
FIG. 2 is a diagram showing a conventional subband decoding system.

Referring to FIG. 2 which is a diagram showing the conventional subband decoding system, the signals are recovered through the procedures in inverse order of those in FIG. 1. That is, the output signals which have been coded by the encoders 34, 35, 36 and 37 of FIG. 1, are recovered to signals Y'11-11, Y'11-12, Y'11-21 and Y'11-22 at the secondary signal recovering circuit 500 through decoders 44, 45, 46 and 47, respectively and pass through up-samplers 501, 502, 503 and 504 and filters 505, 507, 506 and 508, respectively, and then added with the outputs of the filters 505 and 507, 506 and 508 through adders 513 and 514. The output signals of the adders 513 and 514 pass through the up-samplers 509 and 510 and filters 511 and 512, respectively and are added by the adder 515 and then recovered to a signal Y'11. Recovering signals Y'12, Y'21 and Y'22 are sought by decoding the outputs of the encoders 31, 32 and 33 of FIG. 1 by the decoders 41, 42 and 43. The recovering signals Y'11, Y'12, Y'21 and Y'22 which have been sought by the secondary signal recovering circuit 500, are recovered at the primary signal recovering circuit 600 in the vertical direction through the same procedures as those in the secondary signal recovering circuit 500 and then recovered in the horizontal direction, whereby obtaining image data [X'(m,n)].

Figure 3:
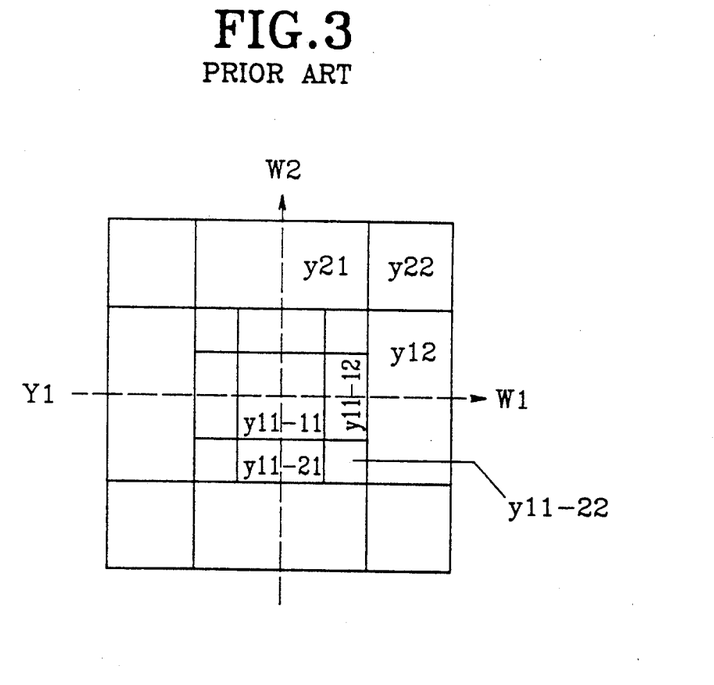
FIG. 3 is an explanatory view illustrating a continuous analysis according to the conventional subband coding method.

FIG. 3 is an explanatory view illustrating the continuous analysis with respect to the frequency band according to the conventional subband coding system of images. As shown in FIG. 3, when image data is bandpass filtered in the horizontal direction W1 and thereafter in the vertical direction, four component primary analysis signals Y11, Y12, Y21 and Y22 are obtained and when the central signal Y11 is analyzed in the horizontal and vertical directions, signals Y11-11, Y11-12, Y11-21 and Y11-22 are obtained, whereby it is possible to obtain seven component analysis signals Y11-11, Y11-12, Y11-21, Y11-22, Y12, Y21 and Y22 through one analyzing procedure.

However, in such a conventional subband coding system there has been a disadvantage in that a uniform analysis with respect to the frequency band is difficult because the frequency band of input signals [X(m,n)] is analyzed orthogonally, i.e., in both the horizontal and the vertical directions and one signal of low-band among the analyzed four components is analyzed into four component signals to obtain seven component analysis signals and also one signal of low-band is analyzed through the same procedures, resulting in the analyzing procedure being repeated two times, thereby causing the low-band component to have a very small frequency band.

SUMMARY OF THE INVENTION

It is, therefore, an object of the present invention to provide a subband coding method and encoding/decoding system which can analyze the frequency band of images uniformly and compress data effectively.

The object of the present invention is accomplished by analyzing image data in the two-dimensional diagonal direction, analyzing a low-band component into horizontal/vertical orthogonal high-band and low-band components, coding the diagonal high-band component and the orthogonal component, and coding the low-band component while repeatedly executing the previous analyzing procedures.

In one aspect, the subband encoding/decoding system of the present invention comprises:

a subband encoding system for encoding input data by a first encoder after allowing the input data to pass through a diagonal high-pass filter and an offset down-sampler, and encoding said input data by second and third encoders after allowing the input data to pass through a second diagonal low-pass filter, orthogonal low-pass and high-pass filters, and down-samplers; and a subband decoding system for obtaining recovery data by allowing outputs of decoders which receive the coded signals to pass through up-samplers and orthogonal low-pass and high-pass filters, allowing an output of a decoder which receivers the coded signal to pass through a diagonal high-pass filter, allowing the output of said filter to pass through a diagonal low-pass filter and to be added with the output signal of said diagonal high-pass filter by a first adder, and by adding the output of the first adder with the output signal of the first orthogonal low-pass filter by a second adder.

BRIEF DESCRIPTION OF THE DRAWINGS

The above and other objects, features and advantages of the invention will become apparent from the following detailed description taken in conjunction with the accompanying drawings, wherein.

DETAILED DESCRIPTION OF THE PREFERRED EMBODIMENTS

Figure 4:
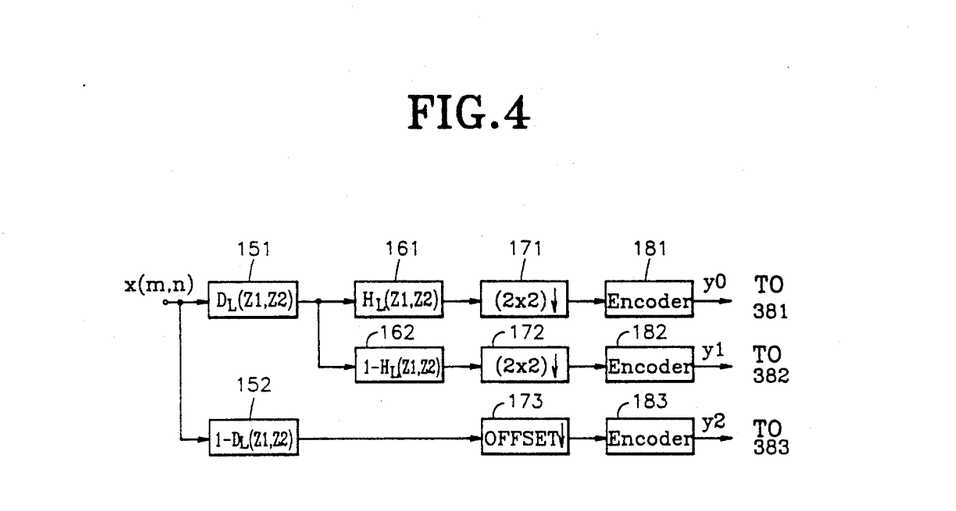
FIG. 4 is a diagram showing a subband encoding system of the present invention.

Referring to FIG. 4 which is a systematic diagram showing the principle of the subband encoding system of images according to the present invention. As shown in FIG. 4, the encoding system is constituted such that input signals [X(m,n)] are analyzed into diagonal high-band and low-band components through diagonal two-dimensional filters 151 and 152 and then a diagonal high-band component y2 being an output of the filter 152 is sampled by an offset down-sampler 173 and coded by an encoder 183, and a diagonal low-band component signal from the filter 151 is sampled by down-samplers 171 and 172 after having passed through filters 161 and 162 and the analysis signals y0 and y1 of which are coded by encoders 181 and 182 are coded.

Figure 5:
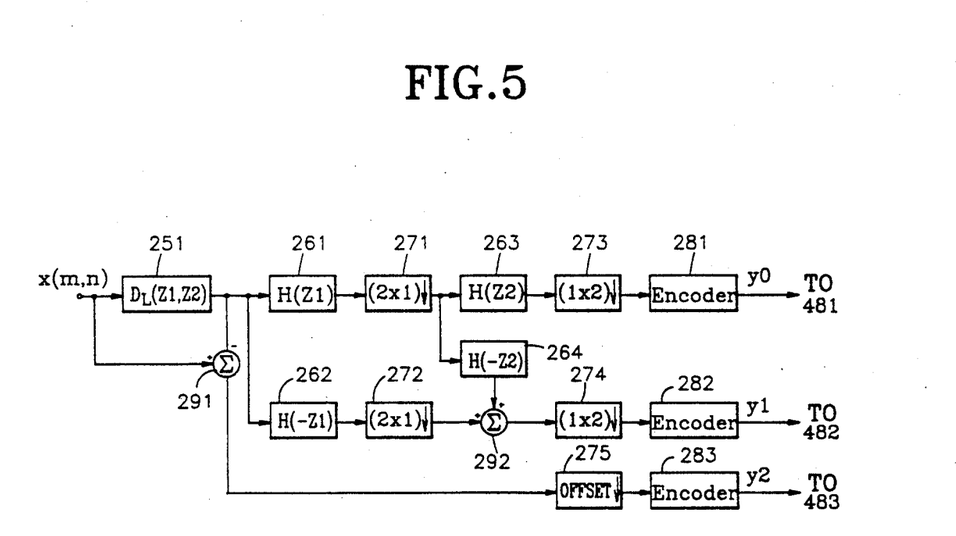
FIG. 5 is a diagram showing a subband encoding system according to an embodiment of the present invention.

Referring to FIG. 5 which is a systematic diagram of the subband encoding system according to an embodiment of the present invention, the encoding system is constituted such that input signals [X(m,n)] are analyzed in the diagonal direction through a diagonal two-dimensional filter 251 and analyzed in the horizontal direction through horizontal analyzing filters 261 and 262. The signal filtered at the filter 251 is subtracted from the input signals [X(m,n)] by a subtracter 291 and the subtracted signal is analyzed by an offset down-sampler 245 and then a diagonal high-band analysis signal y2 is coded by an encoder 283. The outputs of the filters 261 and 262 are sampled by down-samplers 271 and 272, respectively, the output of the sampler 271 is analyzed into vertical-directional low-band and high-band component signals by the filters 263 and 264, the output of the sampler 272 and the output of the filter 264 are added to each other by an adder 292 and thereafter sampled by the down-sampler 274, and the analysis signal y1 is coded by an encoder 282. The output of the filter 263 is sampled by the down-sampler 273 and an analysis signal y0 thereof is coded by an encoder 281.

Figure 6:
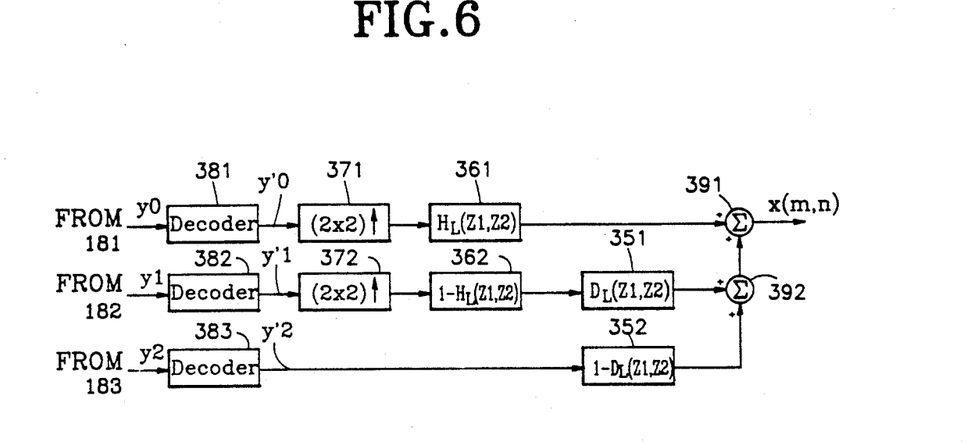
FIG. 6 is a diagram showing a subband decoding system of the present invention.

Referring to FIG. 6 which is a systematic diagram showing the subband decoding system according to the present invention. The decoding system is constituted in the inverse order to that of the subband encoding system of FIG. 4. That is, signals Y0, Y1 and Y2 which have been coded by the encoders 181, 182 and 183, respectively, are decoded by decoders 381, 382 and 383 and thereafter recovered to signals y'0, y'1 and y'2, the recovered signals y'0 and y'1 are up-sampled by up-samplers 371 and 372 and low-pass and high-pass filtered in the vertical and horizontal directions by filters 361 and 362, respectively and the output of the filter 362 passes through a two-dimensional diagonal low-pass filter 351. And the recovered signal y'2 is filtered by a two-dimensional diagonal high-pass filter 352, and then the outputs of the filters 351 and 352 are added to each other by an adder 392 and also added to the output of the filter 361 by an adder 391, thereafter recovered to signals [X'(m,n)].

Figure 7:
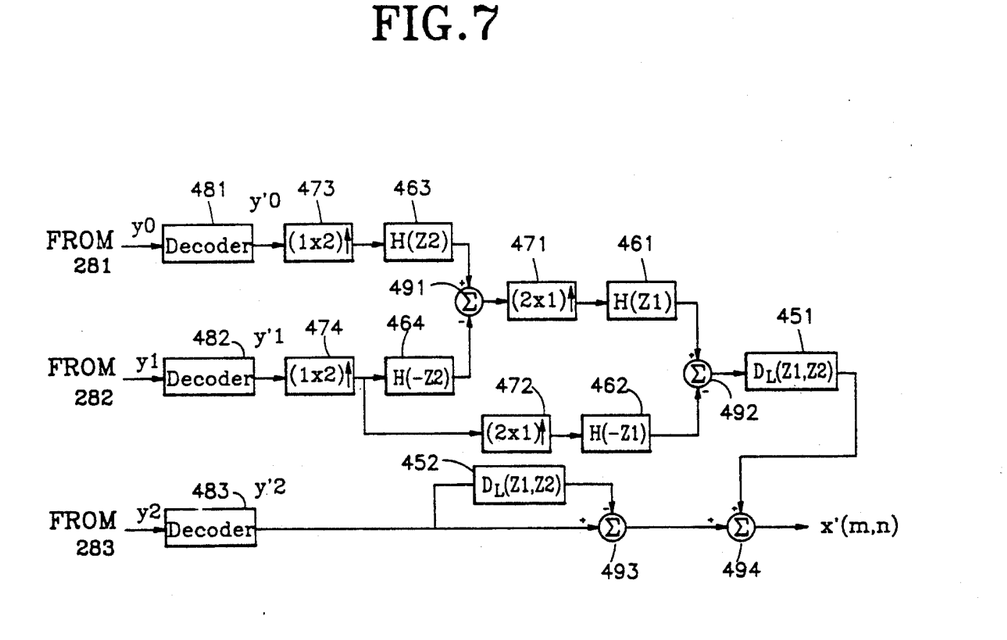
FIG. 7 is a diagram showing a subband decoding system according to an embodiment of the present invention.

Referring to FIG. 7 which is a systematic diagram showing the subband decoding system according to an embodiment of the present invention. As shown in FIG. 7, the decoding system is constituted such that signals Y0, Y1 and Y2 which have been coded by the encoders 281, 282 and 283 of FIG. 5 are recovered to signals y'0, y'1 and y'2 through decoders 481, 482 and 483, the recovered signals y'0 and y'1 are sampled by up-samplers 473 and 474 and filtered by filters 463 and 464 in the vertical direction and then the output of the filter 464 is subtracted from the output of the filter 463 by a subtracter 491, the output of the subtracter 491 is sampled by an up-sampler 471 and filtered by a horizontal filter 461. And the output of the sampler 474 for up-sampling the recovered signal y'1 is sampled by a horizontal up-sampler 472 and filtered by a filter 462, the output of the filter 462 is subtracted from the output of the filter 461 by a subtracter 492 and filtered by a diagonal two-dimensional filter 451.

And, the recovered signal y'2 having passed through the decoder 483 is filtered by a diagonal two-dimensional filter 452 and the output of the filter 452 is subtracted from the recovered signal y'2 by a subtracter 493, and the output of the subtracter 493 and the output of the filter 451 are added to each other by an adder 494 so as to be recovered to final recovery signals [X'(m,n)].

Hereinafter, the operation and effect of the present invention will be described in detail.

According to the systematic diagram of the principle of the subband encoding system of FIG. 4, input data [X(m,n)] are analyzed into low-band and high-band signals in the diagonal direction by the diagonal two-dimensional filters 151 and 152 and a diagonal high-band signal is sampled by the offset down-sampler 173, as a result an analysis signal y2 is coded by an encoder 183. In addition, a diagonal low-band signal outputted from the filter 151 is filtered by filters 161 and 162 in the horizontal and vertical directions and thereafter sampled by down-samplers 171 and 172, as a result analysis signals Y0 and Y1 are coded by encoders 181 and 182.

Referring again to FIG. 5, input signals [X(m,n)] are outputted as an diagonal low-band signal through the diagonal two-dimensional filter 251 and this low-band signal is applied to the subtracter 291 and subtrated from the input signals [X(m,n)] so that a diagonal high-band component is obtained from the subtracter 291, and the high-band component signal is sampled by the offset down-sampler 275 so that a diagonal high-band analysis signal y2 is obtained.

And, the diagonal low-band component signal which is sought by the filter 251 is analyzed into a low-band signal and a high-band signal, respectively, by horizontal orthogonal filters 261 and 262 and then sampled by down-samplers 271 and 272.

At this time, a horizontal low-band signal among the diagonal low-band signals which have been sampled by the sampler 271, is analyzed again into low-band and high-band components by vertical orthogonal filters 263 and 264 and the low-band component signal is sampled as a low-band analysis signal y0 by the down-sampler 273. The horizontal high-band signal among diagonal low-band components which are output of the sampler 272 and the vertical high-pass component signal among diagonal and horizontal low-band components which are output of the filter 264 are added together by an adder 292 and sampled by a down-sampler 274 so that an analysis signal y1 is obtained. Thus obtained analysis signals y0, y1 and y2 are coded by encoders 281, 282 and 283, respectively. That is, the high-band component signals y1 and y2 are once coded, and the low-band component signal y0 is coded in the procedure that three component signals are obtained through the analyzing procedures as described above and thereafter two high-band component signals therefrom are coded, and one low-band component signal is coded while executing repeatedly the analyzing procedures as much as several number of times.

Figure 8:
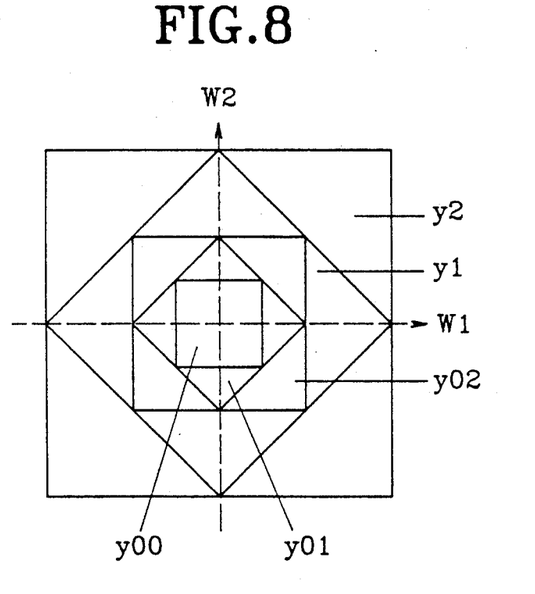
FIG. 8 is an explanatory view illustrating a continuous analysis according to the subband coding method of the present invention.

Referring to FIG. 8 which is an explanatory view illustrating the continuous analysis with respect to the frequency region according to the subband coding system of the present invention. As shown in the drawing, the frequency region is analyzed into a diagonal high-band component signal y2 and a low-band component signal, and the low-band component signal is orthogonally divided in the horizontal direction and then in the vertical direction so as to obtain analysis signals y1 and y0. The analysis signals y2 and y1 are coded and the signal y0 is analyzed in the diagonal direction and in the horizontal and vertical directions so as to obtain secondary analysis signals y02, y01 and y00. Thereafter, the secondary analysis signals y02 and y01 are once coded and the secondary analysis signal y00 is analyzed as much as desired through the same procedures.

Referring again to FIG. 6, each output of the encoders 181, 182 of the subband coding system of FIG. 4 is decoded by decoders 381, 382 and 383 so as to obtain recovery signals y'0, y'1 and y'2, the recovery signals y'0 and y'1 are sampled by the up-samplers 371 and 372, respectively, and filtered to horizontal/vertical and low-band and high-band component signals by the horizontal/vertical and low-pass/high-band filters 361 and 362. The horizontal/vertical and high-band component signal which is an output of the filter 362 is filtered to a diagonal low-band component signal by the diagonal low-band filter 351 and the recovery signal y'2 outputted from the decoder 383 is filtered to a diagonal high-pass component signal and then added to the diagonal low-band component signal outputted from the low-pass filter 351 by the adder 392, and the added signal is also added with the horizontal/vertical low-band signal outputted from the horizontal/vertical low-pass filter 361 so that the recovery signals [X'(m,n)] are obtained.

In the embodiment of FIG. 7, each output of the encoders 281, 282 and 283 of the encoding system of FIG. 5 is decoded by each decoder 481, 482 and 483 so as to obtain recovery signals y'0, y'1 and y'2.

The recovery signal y'2 outputted from the decoder 483 is filtered to a diagonal low-band component through the diagonal low-pass filter 452 and the diagonal low-band component is subtracted from the recovery signal Y'2 outputted from the decoder 483 by the subtracter 493, thereby obtaining a diagonal high-band component signal. The recovery signals y'0 and y'1 outputted from the decoders 481 and 482 are up-sampled by the up-samplers 473 and 474 and filtered to low-band component and high-band component through the vertical filters 463 and 464 and thereafter the output of the filter 464 is subtracted from the output of the filter 463 by the subtracter 491, thereby obtaining a vertical low-band component signal. The signal outputted from the decoder 482 and passed through the vertical up-sampler 474 is up-sampled in the horizontal direction through the horizontal up-sampler 472 and a horizontal high-band component is obtained through the horizontal high-pass filter 462. The output of the subtracter 491 is filtered to obtain a horizontal low-pass component through the horizontal up-sampler 471 and the horizontal low-pass filter 461 and from the horizontal low-band component signal the horizontal high-band component outputted from the filter 462 is subtrated by the subtracter 492.

And, the output of the subtracter 492 is filtered by the diagonal low-pass filter 451 to a diagonal low-pass component signal and the diagonal low-pass component signal is added with the diagonal high-pass component signal outputted from the adder 493 by the adder 494, thereby obtaining recovery signals [X'(m,n)].

Figure 9:
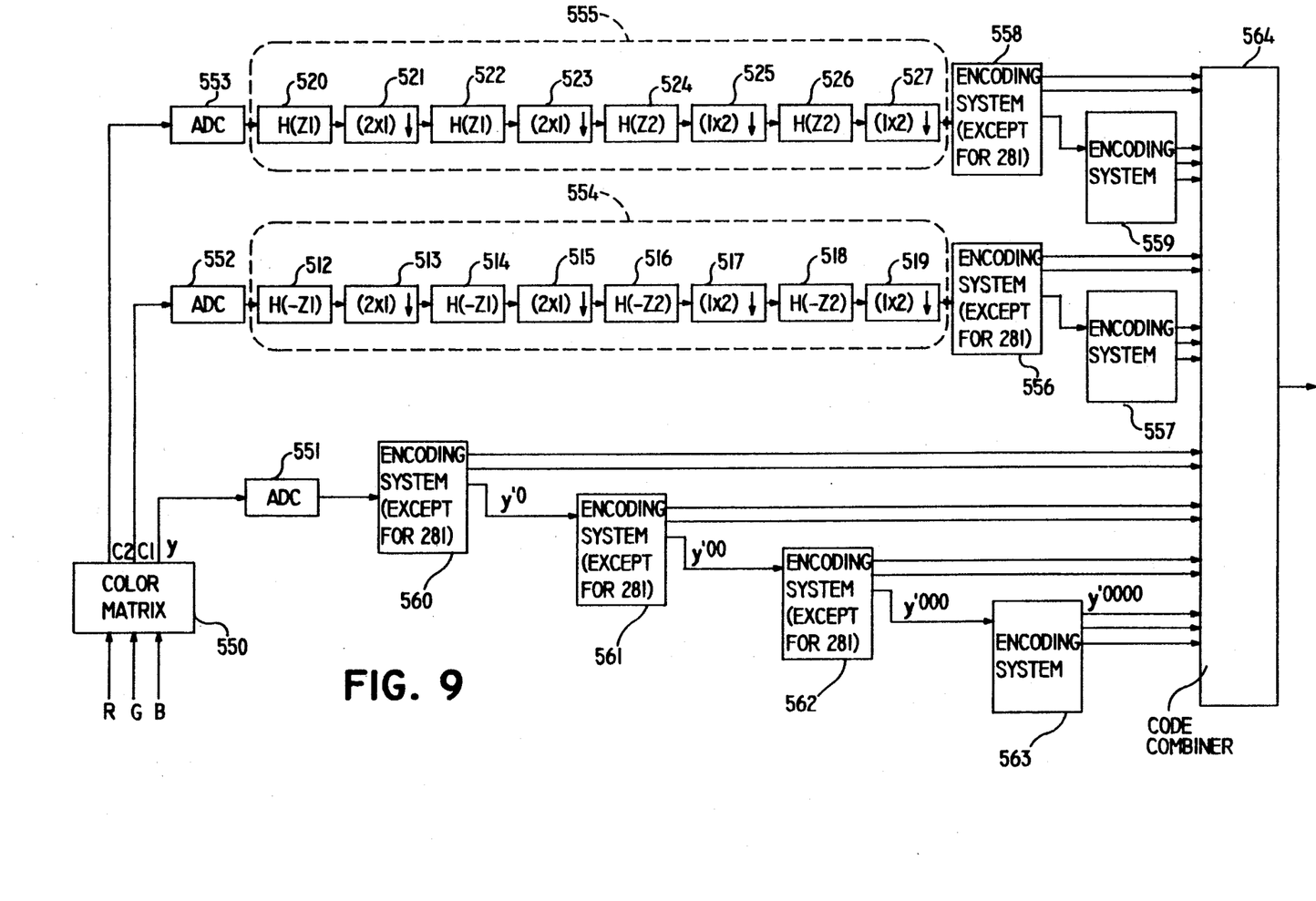
FIG. 9 is a diagram showing a subband encoding system according to an applied embodiment of the present invention.

Referring to FIG. 9, the subband encoding system according to an applied embodiment of the present invention is operated in such a manner that image signals R.G.B. are separated into a luminance signal Y and color signals C1 and C2 through a color matrix unit 550 and the signals Y, C1 and C2 are converted into digital signals through analog/digital converters 551, 552 and 553, respectively. The digitized color signals C1 and C2 are band-compressed by color processing units 554 and 555, respectively, and thereafter separated into three-kind component signals by the subband encoding systems 556 and 558 of FIG. 5 and among the three-kind component signals, two-kind component signals are coded and then outputted signal is separated again into three-kind component signals through the encoding systems 557 and 559 and coded and then outputted to the code combiner 564. And, the digitized luminance signal Y is allowed to pass through the subband encoding systems 560–563 so that two-kind component signals of high-band are encoded while another one-kind component signal of low-band is coded through the next analysis procedure repeatedly, and then the coded signal is outputted to the code combiner 564.

Figure 10:
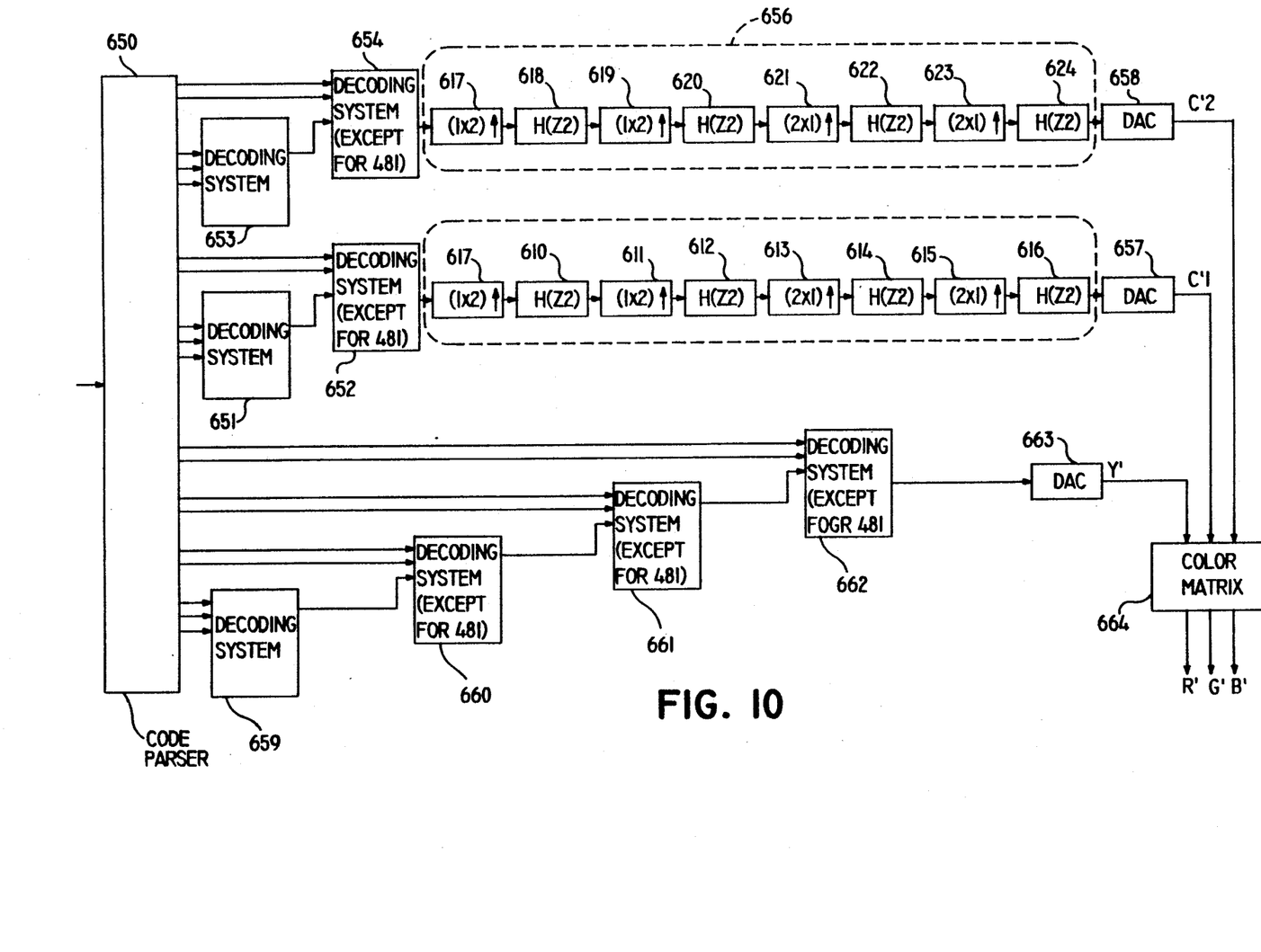
FIG. 10 is a diagram showing a subband decoding system according to an applied embodiment of the present invention.

Referring to FIG. 10, the subband decoding system according to an applied embodiment of the present invention, which is constituted in inverse order of the subband encoding system of FIG. 9, is operated in such a manner that the color signals encoded at the subband encoding systems 557, 556 and 559, 558 of FIG. 9 from the code parser 650 are recovered through the subband decoding systems 651, 652 and 653, 654 and are allowed to pass through the color processing units 655 and 656 which are adapted to execute inverse procedures to those of color processing units 554 and 555 of FIG. 9 and recovered to analog color signals C'1 and C'2 through digital/analog converters 657 and 658 and then the analog color signals C'1 and C'2 are outputted to the color matrix unit 664. The luminance signal Y coded by the subband encoding systems 563, 562, 561 and 560 of FIG. 9 from the code parser 650 is recovered through the subband decoding systems 659, 660, 661 and 662 and recovered to a luminance signal Y' through a digital-/analog converter 663 and then the luminance signal Y' is outputted to the color matrix 664. Accordingly the color matrix 664 outputs the color signals C'1 and C'2 and the luminance signal Y' as image data R', G', B'.

Where, the two-dimensional diagonal low-pass filter [DL(Z1,Z2)] used in the present invention is adapted to separate diagonally a two-dimensional picture signal as shown in FIG. 8 and allows an internal signal which is a low-band component signal to pass therethrough, and the offset down-sampler (offset $\downarrow$) is adapted to down-sample the two-dimensional picture signal to diminish the sampling number by half. And, H(Z1) is a horizontal low-pass filter, H(−Z1) is a horizontal high-pass filter, H(Z2) is a vertical low-pass filter, and H(−Z2) is a vertical high-pass filter. The down-sampler (2×1 $\downarrow$) and the up-sampler (2×1 $\uparrow$) are adapted to execute down-sampling ($\downarrow$) and up-sampling ($\uparrow$) in the horizontal direction, and the down-sampler (1×2 $\downarrow$) and the up-sampler (1×2 $\uparrow$) are adapted to execute down-sampling ($\downarrow$) and up-sampling ($\uparrow$) in the vertical direction.

As described above in detail, the present invention is possible to effectively compress data and can be applied to a high dignity television set when such a data compression is utilized in the picture data because image data are analyzed diagonally and a low-band component therefrom is analyzed orthogonally so as to obtain three kind component signals, an orthogonal high-band component among the diagonal high-band and low-band components is once coded, and an orthogonal low-band component among the diagonal low-band components is analyzed in the diagonal and orthogonal directions and then coded.

What is claimed is:

1. A subband coding method comprising the steps of:
    analyzing a frequency band of input signal into two-dimensional diagonal high-band component and low-band component;
    analyzing said diagonal low-band component into orthogonal high-band component and low-band component;
    coding said diagonal high-band component and orthogonal high-band component; and
    analyzing continuously said orthogonal low-band component by repeating said previous analyzing procedures until the orthogonal low-band component has a desired size.

2. A subband encoding/decoding system comprising:
    a subband encoding system for coding input data by a first encoder after allowing the input data to pass through a diagonal high-pass filter and an offset down-sampler, and coding said input data by second and third encoders after allowing the input data to pass through a second diagonal low-pass filter, orthogonal low-pass and high-pass filters, and down-samplers; and
    a subband decoding system for obtaining recovery data by allowing outputs of decoders which receive the encoded signals to pass through up-samplers and orthogonal low-pass and high-pass filters, allowing an output of a decoder which receives the encoded signal to pass through a diagonal high-pass filter, allowing the output of said filter to pass through a diagonal low-pass filter and to be added with the output signal of said diagonal high-pass filter by a first adder, and by adding the output of the first adder, and by adding the output of the first adder with the output signal of the first orthogonal low-pass filter by a second adder.

3. The system as claimed in claim 1, wherein said subband encoding system is constituted such that input data are subtracted from orginal input data by a subtracter after having passed through a diagonal low-pass filter, an output of the subtracter is coded by an encoder after having passed through an offset down-sampler, an output of the diagonal low-pass filter is allowed to pass through horizontal low-pass and high-pass filters and first and second horizontal down-samplers, respectively, an output of the horizontal down-sampler is allowed to pass through a vertical high-pass filter and to be added with an output of the second horizontal down-sampler by an adder, an output of the adder is coded by a first encoder after having passed through a vertical down-sampler, and an output of the first horizontal down-sampler is coded by a second encoder after having passed through a vertical low-pass filter and a vertical down-sampler.

4. The system as claimed in claim 2, wherein said subband decoding system is constituted such that coded three signals are decoded by first through third decoders, respectively, an output of the third decoder is subtracted from the original output of the third decoder after having passed through a diagonal low-pass filter, outputs of the first and second decoders are allowed to pass through first and second vertical up-samplers and vertical low-pass and high-pass filters and an output of the vertical high-pass filter is subtracted from an output of the vertical low-pass filter by a first subtracter, an output of a second horizontal low-pass filter is subtracted from an output of a first horizontal low-pass filter by a second subtracter after an output of the second up-sampler having passed through the second horizontal up-sampler and the horizontal high-pass filter and an output of the first subtracter having passed through the first horizontal up-sampler and the horizontal low-pass filter, an output of the first subtracter is allowed to pass through the horizontal up-sampler and the horizontal low-pass filter and the output of the second horizontal low-pass filter is subtracted from the output of the first horizontal low-pass filter by the second subtracter, and the output of the second subtracter is allowed to pass through a diagonal low-pass filter and then to be added with the output of the third subtracter by an adder to obtain recovery data.

5. The system as claimed in claim 2, wherein a plurality of subband encoding systems are connected in a multi-stage so that two high-band signals are coded and a low-band signal is continuously analyzed, and a plurality of subband decoding systems are connected in a multi-stage so as to execute a decoding operation in inverse procedures to that of said subband encoding systems.

* * * * *